Patented Feb. 24, 1925.

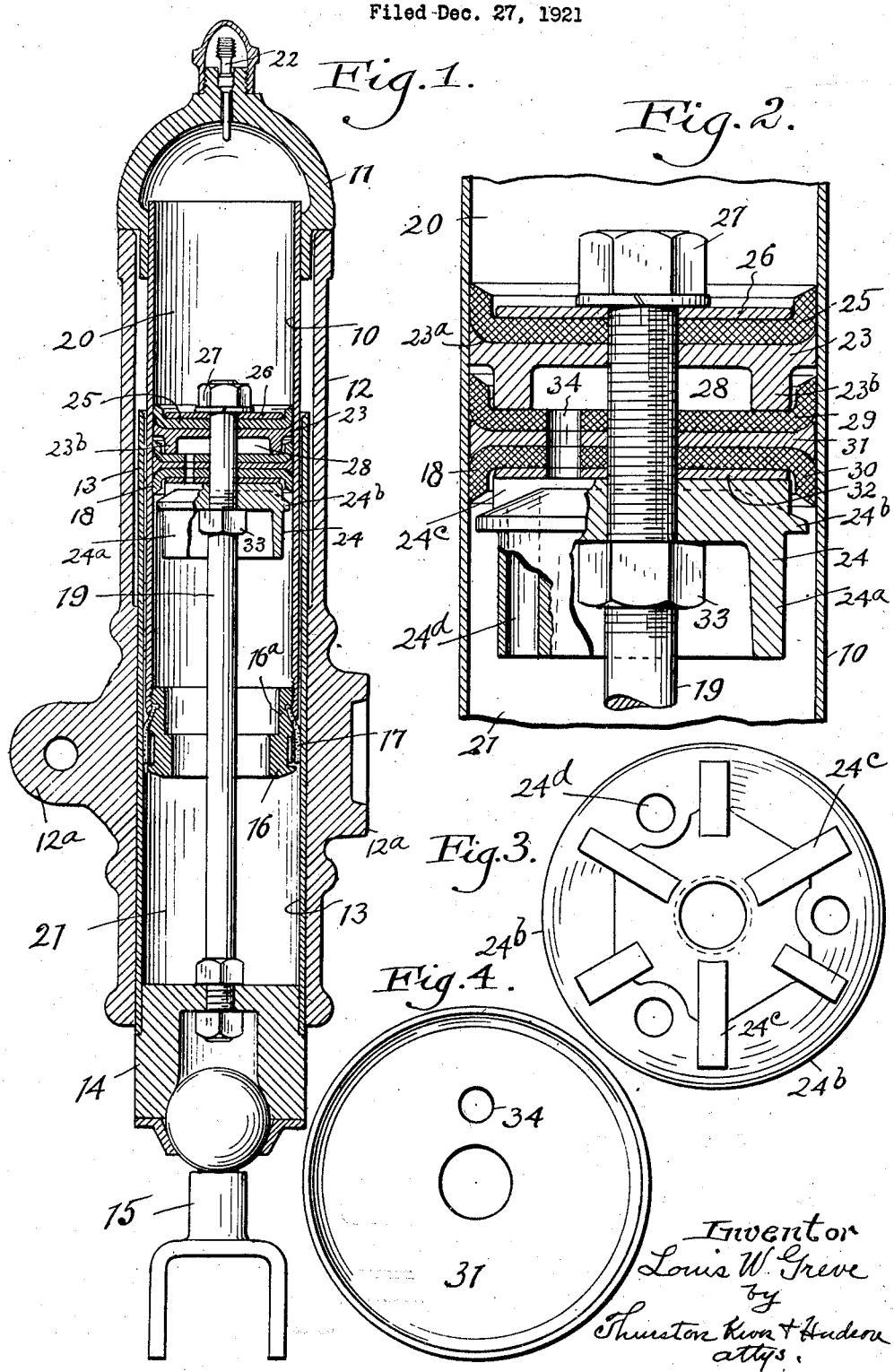

1,527,795

UNITED STATES PATENT OFFICE.

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO.

AIR SPRING FOR VEHICLES.

Application filed December 27, 1921. Serial No. 524,878.

*To all whom it may concern:*

Be it known that I, LOUIS W. GREVE, a citizen of the United States, residing at Cleveland, in the county of Cuyahoga and State of Ohio, have invented a certain new and useful Improvement in Air Springs for Vehicles, of which the following is a full, clear, and exact description.

This invention relates to air springs for vehicles, especially to so-called air springs of the general type disclosed in several patents granted in the name of L. R. Gruss, having a general construction typified by that shown for example, in Patent No. 1,216,254, granted February 13, 1917.

In this type of air spring there are three telescoping sleeves including two upper and one lower sleeve, the latter sliding between the upper sleeves. This forms an expansible cylindrical body, closed at the top and bottom by upper and lower heads, the space between the two inner sleeves being sealed by packing carried by the bottom of the inner upper sleeve and engaging the wall of the lower sleeve. Additionally there is provided inside the inner upper sleeve a piston connected by a rod to the lower head forming a part of the lower sleeve. This piston divides the extensible cylindrical body into two chambers consisting of an upper chamber in which is air under considerable pressure, with a layer of oil over the piston, and a lower closed chamber in which the packing above referred to is located, this lower chamber containing a body of oil which keeps the packing or sliding joint lubricated, and above the oil a body of air which is not intended to be at high pressure.

The piston carries a packing which engages the upper inner sleeve, the function of this packing being to prevent leakage of oil and air from the upper chamber to the lower chamber. Likewise, as in the Gruss spring a dash pot effect is obtained, the function being to check the expansion movement when the cylindrical body has been extended substantially its full amount. This is produced by providing at the bottom of the inner upper cylinder a collar which carries the packing referred to, with the portions so shaped that at the extreme expansion movement a depending flange on the bottom of the piston is received therein with a fairly close fit, forming a more or less confined space in which oil is trapped.

This dash pot effect at times creates a severe upward pressure on the oil, and should the oil be forced up into the upper chamber it would seriously affect the operation of the spring as it would decrease the available space for air and create an excessive pressure in the upper chamber. To avoid the passage of oil to the upper chamber the piston has been provided with a relief space and also certain relief ports.

The principal object of the present invention is to provide a piston construction, and particularly an arrangement of the packing such that the passage of oil into the upper chamber and at the same time leakage of oil or air from the upper chamber to the lower chamber are entirely avoided.

The invention may be briefly summarized as consisting in certain novel details of construction, and combinations and arrangements of parts which will be described in the specification and set forth in the appended claims.

In the accompanying sheet of drawings, Fig. 1 is a vertical sectional view of a spring of the general type heretofore referred to, and to which my invention has been applied; Fig. 2 is an enlarged fragmentary vertical sectional view showing particularly the construction of the piston and the arrangement of the packing elements; Fig. 3 is a top plan view of the lower piston element; and Fig. 4 is a plan view of the disk interposed betweeen the lower pair of packing elements of the piston.

Referring now to the drawings, it will be seen that the air spring herein illustrated includes an inner upper sleeve 10 having an upper head 11, an outer concentric upper sleeve 12 spaced somewhat from the inner sleeve, and a lower sleeve 13 which is provided with a lower head 14, and which is telescopically or slidably arranged between the two upper sleeves. The outer sleeve, which may be in the form of a relatively stiff and relatively thick housing, is adapted to be secured to the chassis by a part indicated at 12ª, and the head 14 of the lower sleeve 13 is designed to be secured by any suitable device such as that indicated at 15, to a spring of the vehicle with which a set of these springs is adapted to be employed, the part 15 here shown, being in the form of a special shackle which in this case is used in connection with the rear spring.

At the bottom of the inner upper sleeve 10 is secured a collar 16, which carries packing 17, adapted to be pressed out against the inner surface of the lower sleeve 13, to avoid leakage between the two inner sleeves, i. e. the inner upper sleeve 10 and lower sleeve 13.

Slidingly engaging the inner wall of the inner sleeve 10 is a piston designated as a whole in Fig. 1, by the reference character 18, this piston being carried at the top of a rod 19, which is fixed at its lower end to the lower head 14, which is carried by, or forms a part of the lower sleeve 13. It will be observed that this piston divides the telescopic cylindrical body into two main chambers consisting of an upper main pressure chamber 20, and a lower chamber 21. The upper chamber is adapted to be provided with a small quantity of oil above the piston, and with air under considerable pressure, the oil and air being adapted to be supplied through the upper head 11 by a suitable valve means indicated at 22, which valve means may be of any suitable construction. The lower chamber is adapted to be provided with a quantity of oil, one of the functions of which is to seal the sliding joint at the packing 17, the oil level normally standing above this packing. Additionally the lower chamber contains air at or about atmospheric pressure, though the pressure in this chamber varies slightly when the spring is in use, due to the fact that there is a slight change in the capacity of the lower chamber as the sleeves telescope.

It will be observed that the upper portion of the collar 16 is slightly enlarged, as shown at 16ª, forming a pocket in which is adapted to be received a depending flange, hereinafter referred to, on the bottom of the piston. These parts form in effect a dash pot which traps a certain amount of oil and stops the expansion movement of the sleeves with a cushioning effect between the metal bodies which would otherwise come together and stop the movement. However, as the movements frequently take place very rapidly, the pressure on the trapped oil rises very materially, and to avoid oil being forced up into the upper chamber, a relief space and relief ports have been provided. To entirely prevent the oil being driven up into the upper chamber by this dash pot effect, or by any other action irrespective of whether the relief space and relief ports are provided, the following piston construction has been provided, reference being had to Fig. 2.

The piston is provided with two main sections consisting of an upper section 23 and a lower section 24. On top of the upper section is provided a packing in the form of a cup leather 25 which is turned upwardly at its margin, the function of this cup leather being to hold the compression in the upper chamber and prevent leakage of oil or air from the upper chamber to the lower chamber. It will be observed that the top of the upper section 23 of the piston is adjacent its margin, turned upwardly or given a rounded seat designated 23ª for the outer or marginal part of the cup leather 25, and that the leather is held down onto the top of the section 23 of the piston by an upper disk 26 which is clamped down against the leather by a nut 27 on the upper end of the piston rod 19. This disk extends well out toward the wall of the sleeve 20, substantially to the upturned margin of the cup leather so as to hold the latter where it is turned upwardly, against the rounded seat 23ª and against the wall of the sleeve 10. The bottom of the piston section 23 has a downwardly extending annular flange 23ᵇ inside of which there is a relief chamber 28, this flange being spaced a sufficient distance from the sleeve 10 to provide room for a cup leather beneath.

The lower piston section 24 is provided with a downturned flange 24ª constituting an element which cooperates with the collar 16 to form the dash pot. At the top of this flange there is a laterally extending rim or flange 24ᵇ which extends toward, but not quite to the sleeve 10. Above this flange the upper part of the lower piston section 24 tapers inwardly and at the extreme top there are a series of horizontal ribs 24ᶜ which are radially disposed, as shown in Fig. 3. Extending down through the depending flange 24ª are a series of ports 24ᵈ which are arranged between certain of the ribs 24ᶜ, these ports being open at the top and bottom for the escape of oil which is trapped between the parts of the dash pot.

Between the flange 23ᵇ at the bottom of the upper piston section and the ribs 24ᶜ at the top of the lower piston section 24, a special packing is provided, consisting of an upper cup leather 29, a lower cup leather 30, an intermediate spacer 31, and a disk 32 which is between the cup leather 30 and the ribs 24ᶜ. All these parts, as well as the piston sections 23 and 24 and the packing elements above the upper piston section 23 are tightly clamped between the nut 27 and a nut 33 which is also on the piston rod 19 and engages the lower part of the lower piston section 24 inside the annular depending flange 24ª.

The upper cup leather 29 has its marginal portion turned upward, and assists the upper cup leather 25 in the prevention of leakage of oil or air downward, the up-turned marginal part of this cup leather being located between the sleeve 10 and the flange 23$^b$ on the bottom of the upper piston section 23. The lower cup leather 30 has its marginal portion turned downward, the downturned portion being located between the sleeve 10 and the ribs 24$^c$ at the top of the lower piston section 24. The chief function of this cup leather is to prevent the leakage of oil or air from the lower chamber to the upper chamber, particularly when the oil is compressed by the dash pot effect already referred to; also if for any other reason the pressure rises in the lower chamber to a point above the pressure in the upper chamber.

The spacer 31 has its marginal portion rounded and turned upward at the top and downward at the bottom, forming two rounded seats for both the upturned and downturned cup leathers 29 and 30, the construction being such that both cup leathers are kept well pressed out against the sleeve 10. The lower disk or seat 32 which engages the bottom of the lower cup leather 30 extends well out toward the downturned margin of the cup leather 30 and keeps the outer part of the cup leather pressed well up against the rounded seat formed by the spacer 31. The downturned flange 23$^b$ of the upper piston section 23 has a similar function with respect to the upturned cup leather 29. In consequence all three cup leathers, including the two turned upward and the one turned downward are so supported adjacent the part turned up or down, that leakage in any direction is effectively avoided, and furthermore the effect of thus supporting these cup leathers is such that they are incapable of flexing any material distance in from the sleeve 10 which they engage, so that a feature of great durability is provided, and the tightness of the joint is maintained throughout a long period of use, notwithstanding the fact that at times the springs may be idle for periods of varying lengths.

In this instance I have provided between the parts 29, 30, 31 and 32 of the lower packing assembly, a port 34 which allows a certain amount of oil, when the severe compression takes place as a result of the dash pot effect, to flow up into the chamber 28. At the same time, part of the oil may escape and flow downward through the ports 24$^d$. However, irrespective of whether these relief features are provided in the way of the port 34 leading to the chamber 28 above the lower packing assembly and in the way of the relief ports 24$^d$, the packing as I have arranged it effectively prevents leakage of oil and air either up or down.

While the flexible packing members 25, 29 and 30 are referred to as cup leathers, it is to be understood that they may be formed of other material than leather.

Having described my invention, I claim:

1. In an air spring, a cylindrical body having upper and lower telescopic sleeves, and having a piston connected to or movable with one sleeve and slidingly engaging the other sleeve forming a main pressure chamber on one side of the piston, and a separate chamber on the opposite side of the piston, each of said chambers adapted to contain air and oil, and a packing carried by said piston including a plurality of flexible packing elements, one having its marginal portion turned upward, and another having its marginal portion turned downward.

2. An air spring composed of upper and lower telescopic sleeves forming an expansible cylindrical body closed at the top and bottom, a packing for the prevention of leakage between the sleeves, and a piston carried by the lower sleeve and slidingly engaging the wall of the upper sleeve forming a main pressure chamber above the piston and a chamber beneath the piston normally of less pressure, and a packing carried by the piston comprising a plurality of flexible packing elements having marginal portions turned upward and downward, said piston having seats with rounded portions engaging the packing adjacent the margin thereof.

3. An air spring composed of upper and lower telescopic sleeves forming an expansible cylindrical body closed at the top and bottom, a packing for the prevention of leakage between the sleeves, and a piston carried by the lower sleeve and slidingly engaging the wall of the upper sleeve forming a main pressure chamber above the piston and a chamber beneath the piston normally of less pressure, and a packing carried by the piston comprising a plurality of flexible packing elements having marginal portions turned upward and downward, and said piston having seats with rounded portions engaging the packing adjacent the margin thereof, and means for holding each flexible packing element down against its seat.

4. In an air spring, a pair of telescopic sleeves forming an expansible cylindrical body closed at the top and bottom, a packing to prevent leakage between the sleeves, a piston movable with the lower sleeve and slidingly engaging the inner wall of the upper sleeve, dividing the cylindrical body into chambers including an upper main pressure chamber and a lower chamber adapted to be supplied with air and oil, said piston being composed of sections, the upper section having a flexible packing element with an upturned marginal portion, there being between the two sections a flexible packing element having a downturned marginal portion.

5. In an air spring, a pair of telescopic sleeves forming an expansible cylindrical body closed at the top and bottom, a packing to prevent leakage between the sleeves, a piston movable with the lower sleeve and slidingly engaging the inner wall of the upper sleeve, dividing the cylindrical body into chambers including an upper main and a lower chamber, said piston being composed of sections, the upper section having a flexible packing element with an upturned marginal portion, there being between the two sections a flexible packing element having a downturned marginal portion, each of said packing elements having a rounded seat adjacent its marginal portion.

6. In an air spring, a pair of telescopic sleeves forming an expansible cylindrical body closed at the top and bottom, a packing to prevent leakage between the sleeves, a piston movable with the lower sleeve and slidingly engaging the inner wall of the upper sleeve, dividing the cylindrical body into chambers including an upper main pressure chamber and a lower chamber, said piston being composed of sections, the upper section having a flexible packing element with an upturned marginal portion, there being between the two sections a flexible packing element having a downturned marginal portion, each of said packing elements having a rounded seat adjacent its marginal portion, and means opposite said seat for pressing the packing element against the same.

7. In an air spring for vehicles, an upper and lower sleeve telescopically arranged, forming a cylindrical body closed at the top and bottom, a piston movable with the lower sleeve and slidingly engaging the upper sleeve and dividing the body into an upper chamber and a lower chamber, said piston consisting of upper and lower sections, the upper section having a flexible packing element with an upturned marginal portion, and there being clamped between the two sections a packing assembly comprising a pair of flexible packing elements one with an upturned marginal portion and the other with a downturned marginal portion.

8. In an air spring for vehicles, an upper and lower sleeve telescopically arranged, forming a cylindrical body closed at the top and bottom, a piston movable with the lower sleeve and slidingly engaging the upper sleeve and dividing the body into an upper chamber and a lower chamber, said piston consisting of upper and lower sections, the upper section having a flexible packing element with an upturned marginal portion, and there being clamped between the two sections a packing assembly comprising a pair of flexible packing elements one with an upturned marginal portion and the other with a downturned marginal portion, rounded seats being provided for said packing elements.

9. In an air spring for vehicles, an upper and lower sleeve telescopically arranged, forming a cylindrical body closed at the top and bottom, a piston movable with the lower sleeve and slidingly engaging the upper sleeve and dividing the body into an upper chamber and a lower chamber, said piston consisting of upper and lower sections, the upper section having a flexible packing element with an upturned marginal portion, and there being clamped between the two sections a packing assembly comprising a pair of flexible packing elements one with an upturned marginal portion and the other with a downturned marginal portion, there being a spacer between said last two flexible packing elements.

10. In an air spring for vehicles, an upper and lower sleeve telescopically arranged, forming a cylindrical body closed at the top and bottom, a piston movable with the lower sleeve and slidingly engaging the upper sleeve and dividing the body into an upper chamber constituting a main pressure chamber adapted to contain oil and air, and a lower chamber of relatively low pressure adapted to be supplied with a quantity of oil, said piston consisting of upper and lower sections, the upper section having a flexible packing element with an upturned marginal portion, and there being clamped between the two sections a packing assembly comprising a pair of flexible packing elements one with an upturned marginal portion and the other with a downturned marginal portion, there being a spacer between said last two flexible packing elements, said spacer being provided with rounded seat portions for the outer portions of both said flexible packing elements.

11. In an air spring, a pair of telescoping cylinders, a piston carried by one and slidable in the other dividing the space into upper and lower cushioning chambers, each adapted to contain air and oil, said piston having its head formed in two parts, and a packing carried on the upper face of each part, the packing on one part comprising an upturned cup leather and the packing on the other part comprising a downwardly turned cup leather.

12. In an air spring comprising a piston dividing the space within into upper and lower cushioning chambers adapted to contain a compressible fluid and an incompressible fluid, the upper chamber forming a compression and cushioning chamber and the lower chamber acting on compression of the spring as a cushioning chamber and on expansion of the spring to create a vacuum in said lower chamber to counteract the expansive action of the air in the upper chamber, in combination with means on the piston for preventing communication between the chambers in either direction, 13. In an air spring comprising telescoping cylinders closed at their outer ends and enclosing a space, a piston working in the upper cylinder carried by the lower cylinder and dividing said space into upper and lower chambers each adapted to contain air for cushioning purposes and oil as a seal and said piston having packing, including an upturned cup leather and a downwardly turned cup leather, whereby communication between the two chambers is prevented.

In testimony whereof, I hereunto affix my signature.

LOUIS W. GREVE.